(12) United States Patent
Lavoie (10) Patent No.: US 12,483,868 B2
(45) Date of Patent: Nov. 25, 2025

(54) ASSET TRACKING AND MANAGEMENT SYSTEMS AND METHODS

(71) Applicant: Ford Global Technologies, LLC, Dearborn, MI (US)

(72) Inventor: Erick Michael Lavoie, Van Buren Charter Township, MI (US)

( * ) Notice: Subject to any disclaimer, the term of this patent is extended or adjusted under 35 U.S.C. 154(b) by 252 days.

(21) Appl. No.: 18/332,995

(22) Filed: Jun. 12, 2023

(65) Prior Publication Data
US 2024/0414508 A1     Dec. 12, 2024

(51) Int. Cl.
  *G06V 20/56*   (2022.01)
  *H04W 4/029*   (2018.01)
  *H04W 4/40*    (2018.01)

(52) U.S. Cl.
  CPC .............. *H04W 4/40* (2018.02); *G06V 20/56* (2022.01); *H04W 4/029* (2018.02)

(58) Field of Classification Search
  CPC ......... H04W 4/40; H04W 4/029; G06V 20/56
  See application file for complete search history.

(56) References Cited

U.S. PATENT DOCUMENTS

| | | | |
|---|---|---|---|
| 7,307,514 B2 | 12/2007 | McAden | |
| 8,599,003 B2 | 12/2013 | Roberts, Sr. et al. | |
| 9,551,788 B2 | 1/2017 | Epler | |
| 10,858,053 B2 | 12/2020 | Bean et al. | |
| 2019/0095861 A1* | 3/2019 | Baldwin | G06Q 10/0838 |
| 2022/0024465 A1* | 1/2022 | Padgett | G01F 23/296 |

FOREIGN PATENT DOCUMENTS

CN     206584203 U     10/2017

OTHER PUBLICATIONS

Christoph Heinbach, et al., Exploring Design Requirements of Fleet Telematics Systems Supporting Road Freight Transportation: A Digital Service Side Perspective, ResearchGate, 17th International Conference on Wirschaftsinformatik, Feb. 2022, 1-16.
Tammy E. Trimble, et al., Market Guide to Fleet Telematics Services, Market Guide to Fleet Telematics Services, Dec. 21, 2012, 1-78.

* cited by examiner

*Primary Examiner* — Mathew Franklin Gordon
(74) *Attorney, Agent, or Firm* — Emily Drake; Eversheds Sutherland (US) LLP (57) ABSTRACT

An example asset tracking and management method executed by a processor in a vehicle or a trailer of the vehicle can include detecting a detachment of the trailer from the vehicle at a first geographical location. A message may be sent to a server/cloud computer to inform the server/cloud computer of the detachment of the trailer from the vehicle. The message can include location information for identifying the first geographical location. Inventory information such as, for example, a tracking number and/or a description of an item contained in the trailer may also be sent. The server/cloud computer receives the message and assigns another vehicle to travel to the first geographical location by using the location information and transport the trailer or the item to a second geographical location. The second geographical location can be a destination for delivery of the item.

20 Claims, 5 Drawing Sheets

ASSET TRACKING AND MANAGEMENT SYSTEMS AND METHODS

BACKGROUND

There are many challenges associated with keeping track of, and managing, the transportation of various types of items from one location to another, particularly when the transportation involves multiple vehicles. It is desirable to address at least some of these challenges.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to asset tracking and management systems and methods. It must be understood that the various operations described herein should always be implemented and/or performed in accordance with the owner manual and safety guidelines. An example method in accordance with the disclosure that is executed by a processor of an asset tracking and management system located in a vehicle or a trailer of the vehicle can include detecting a detachment of the first trailer from the vehicle at a first geographical location. A message may be sent by the processor to another processor, which can be a part of a server/cloud computer, to inform the server/cloud computer of the detachment of the trailer from the vehicle. The message can include location information for identifying the first geographical location. The processor of the asset tracking and management system may also send to the server/cloud computer, inventory information such as, for example, a tracking number and/or a description of an item contained in the trailer. The server/cloud computer receives the message and may assign another vehicle to travel to the first geographical location by using the location information and transport the trailer or the item contained in the trailer, to a second geographical location. The second geographical location can be a destination for delivery of the item.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "item," "object," "package," and "asset" as used herein refers to any object transported in a vehicle. Words such as "location," "stop," and "spot" may be used herein in an interchangeable manner and generally refer to a geographical location. The word "information" as used herein pertains to any of various forms of data that can be processed by a processor (digital data, digital images, detector signals, etc.). Words such as "attach," "detach," "hitch," and "unhitch" may be used interchangeably. The word "image" as used herein encompasses one or more images in one or more forms. Thus, for example, a description herein of an action associated with an "image" must be understood to indicate an action performed upon a single image in some scenarios and upon multiple images in some other scenarios. The multiple images can be included in various forms such as, for example, in the form of a video clip and/or in the form of real-time video. The word "detector," which may be used interchangeably with the word "sensor," as used herein refers to any device than may be used to obtain information about an object, to detect the presence of an object, and/or to detect actions performed by individuals. It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
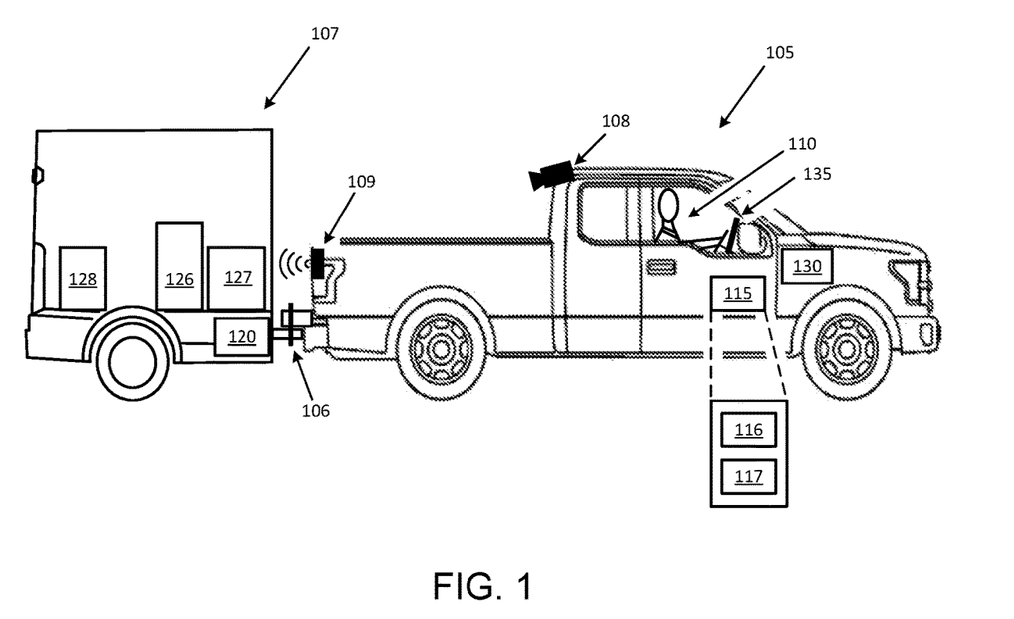
FIG. 1 shows an example vehicle that includes an asset tracking and management system in accordance with an embodiment of the disclosure.

FIG. 1 shows a vehicle 105 that includes an asset tracking and management system 115. The vehicle 105 in this example is a truck having a hitch 106 that can be used to hitch a trailer such as, for example, the illustrated example trailer 107. In other embodiments, the vehicle 105 can be any of various types of vehicles that include a hitch for attaching a trailer such as, for example, a van, a truck, a sedan, a station wagon, an 18-wheeler, an autonomous vehicle, an electric vehicle, a gasoline vehicle, and a hybrid electric vehicle.

Another asset tracking and management system 120 may be located in a trailer 107 that is detachably coupled to the vehicle 105. In another embodiment in accordance with the disclosure, either the asset tracking and management system 115 or the asset tracking and management system 120 can be omitted. It must be understood that the description provided herein with respect to the asset tracking and management system 115 located in the vehicle 105 can be equally applicable to the asset tracking and management system 120 located in the trailer 107 of the vehicle 105, and vice-versa. It must also be understood that the description provided herein with respect to a driver 110 of the vehicle 105 is equally applicable to a computer of an autonomous vehicle, when the vehicle 105 is an autonomous vehicle. Accordingly, various actions described herein with respect to the driver 110 of the vehicle 105 may be carried out by either the computer of the autonomous vehicle and/or by an occupant of the autonomous vehicle.

The vehicle 105 may also include other components such as, for example, a vehicle computer 130, an infotainment system 135, a camera 108, and an object sensor 109. The camera 108 is an example imaging device and several other cameras may be used in other implementations. The object sensor 109 is also an example sensor/detector and several such sensors and detectors may be used in other implementations. The various components provided in the vehicle 105 may be communicatively coupled to the asset tracking and management system 115 and/or the asset tracking and management system 120 via a wired communication system and/or a wireless communication system.

The vehicle computer 130 may perform various functions of the vehicle 105, such as, for example, controlling engine operations (fuel injection, speed control, emissions control, braking, etc.), managing climate controls (air conditioning, heating etc.), and issuing messages (check engine light, bulb malfunction, low tire pressure, etc.). The vehicle computer 130 may also provide various types of information to the asset tracking and management system 115, such as, for example, information pertaining to operations associated with the vehicle 105 (movement status, parked status, trailer connection status, etc.).

The infotainment system 135 can be an integrated unit that includes various components such as a radio, a display screen, a speaker, and other components such as a USB access port, a Bluetooth® system, Ultra-Wide Band (UWB) system, and a global positioning satellite (GPS) navigation system. In an example implementation, the display screen may include a graphical user interface (GUI) for use by the driver 110. The GUI may be used for various purposes such as to enter commands for interacting with the GPS navigation system, to select a phone number for making a phone call, and to make a song selection. In an example implementation, the GUI may be used by the driver 110 of the vehicle 105 to communicate with the asset tracking and management system 115 in accordance with the disclosure.

The vehicle 105 can further include one or more detectors, sensors, and/or imaging devices. The detectors can be any of various types of detection devices such as, for example, a motion sensor, a magnetic sensor, a radar detector, a sonar detector, a light detection and ranging (LIDAR) detector, and/or an infrared detector. The sensors can be any of various types of sensing devices such as, for example, a position sensor coupled to a gearshift of the vehicle 105 that provides information about a position of the gearshift (in drive, in park, in reverse, or in neutral). The information may be conveyed to the asset tracking and management system 115 to enable the asset tracking and management system 115 identify a status of the vehicle 105 (moving, stopped, etc.). The object sensor 109 is another example sensor that is configured to convey a signal to the asset tracking and management system 115 when the trailer 107 is detached from the vehicle 105.

The imaging devices can include any of various types of cameras such as, for example, a digital camera, a video camera, or an infrared camera. In the illustrated implementation, the camera 108 is an example device configured to provide information to the asset tracking and management system 115 in the form of images. In other implementations, additional cameras and/or other types of devices may be used to provide information to the asset tracking and management system 115. The images provided by the cameras may be evaluated by the asset tracking and management system 115 for various purposes. In an example scenario, the asset tracking and management system 115 may evaluate images provided by the camera 108 to detect a detachment of the trailer 107 from the vehicle 105.

The asset tracking and management system 115 can include a processor 116 and a memory 117 in which are stored instructions that are executable by the processor 116 for performing various operations in accordance with the disclosure. For example, the processor 116 may execute various operations associated with inventory, tracking, and management, of various items located inside the trailer 107. Some example items that are shown in FIG. 1 include a first item 128, a second item 126, and a third item 127. Each of these example items may be due for delivery at a single location or at multiple locations.

In an example scenario, the first item 128 and the third item 127 are due for delivery at a first location along a travel route of the vehicle 105 and the second item 126 is due for delivery at a second location along the travel route. The travel route of the vehicle 105 can be, for example, a delivery route for making deliveries of some or all of the items contained in the trailer 107.

In a first example scenario, a first travel route of the vehicle 105 includes the first location but not the second location. Consequently, an arrangement has to be made to transfer the second item 126 to another vehicle having a second travel route that includes the second location. Operations associated with transferring and tracking the second item 126 in accordance with the disclosure are performed in part by the asset tracking and management system 115 and/or the asset tracking and management system 120 in cooperation with other devices that are communicatively coupled to the asset tracking and management system 115 and/or the asset tracking and management system 120 via a wireless network (not shown). The other devices (not shown) can be a server computer or a cloud computer, for example.

In a second example scenario, all the items contained in the trailer 107 are destined to the second location. The vehicle 105 conveys the trailer 107 to an intermediate location that is included in the travel route of the vehicle 105. In this scenario, the asset tracking and management system 115 and/or the asset tracking and management system 120 cooperate with the server computer or cloud computer to arrange for a detachment of the trailer 107 from the vehicle 105 at the intermediate location and attachment of the trailer 107 to another vehicle (not shown) having a travel route that includes the second location. Additional details about such operations are provided below.

Figure 2:
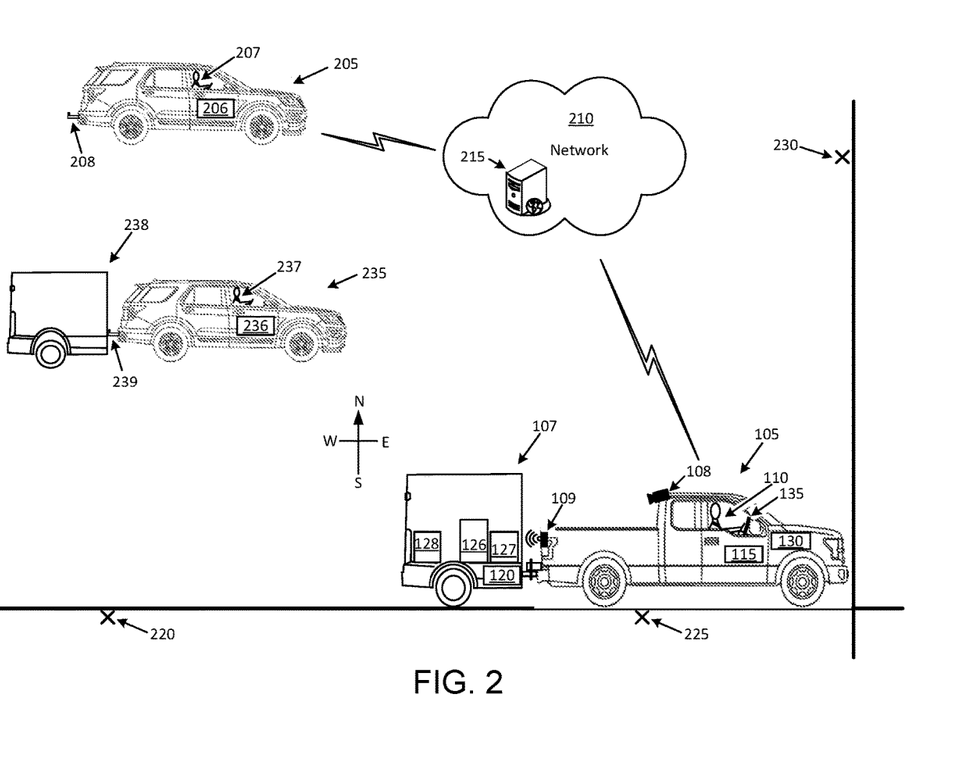
FIG. 2 illustrates an example scenario associated with operations of an asset tracking and management system in accordance with an embodiment of the disclosure.

FIG. 2 illustrates an example scenario associated with operations of the asset tracking and management system 115 (and/or the asset tracking and management system 120) in accordance with an embodiment of the disclosure. In this example scenario, the vehicle 105 travels from an origination spot 220 (warehouse, dock, manufacturing facility, etc.) and travels eastwards on a first travel route that includes a first spot 225. The driver 110 parks the vehicle 105 at the first spot 225 and detaches the trailer 107 from the vehicle 105. The object sensor 109 detects the detachment of the trailer 107 from the vehicle 105 and conveys a sensor signal to the asset tracking and management system 115. The asset tracking and management system 115 may evaluate the sensor signal and determine that the trailer 107 has been detached from the vehicle 105. In an example operation, the asset tracking and management system 115 may seek confirmation of the detachment and may issue a command to the camera 108 to capture an image of the trailer 107. The asset tracking and management system 115 may evaluate one or more images captured by the camera 108 to confirm that the trailer 107 has been detached from the vehicle 105.

The asset tracking and management system 115 then wirelessly transmits a message via a network 210 to a computer 215. The message provides information about the detachment of the trailer 107 from the vehicle 105 and includes location information of the first spot 225. The location information of the first spot 225 may be conveyed in any of various forms such as, for example, by the use of global positioning system (GPS) coordinates, in the form of an address ("truck stop off I-85 five miles East of Hometown" "12568 Allen Road, Anytown," for example), or by use of landmarks (town square, xxx gas station, yyy Inn," etc.).

The asset tracking and management system 115 may also communicate various other types of information to the computer 215, such as, for example, an identification label of the trailer, an odometer reading of the trailer 107 and/or of the vehicle 105, inventory information of the contents of the trailer 107, and details about one or more of the items in the trailer 107. Item details can include, for example, tracking number, identification label, size, shape, addresses, and dates (delivery date, shipping date, etc.).

The computer 215 can be, for example, a cloud computer or a server computer of a fleet operator who manages various operations of a vehicle fleet that includes the vehicle 105 and additional vehicles such as, for example, a vehicle 205 that includes a hitch 208 and a vehicle 235 that includes a trailer 238 attached to the vehicle 235 by use of a hitch 239. The various operations can include, for example, scheduling, assigning travel routes, managing travel routes, tracking items transported by the various vehicles, and maintaining an inventory of the various items transported by the various vehicles.

In a first example scenario, the item 127 in the trailer 107 is due for delivery to a second spot 230 that is not included in the first travel route of the vehicle 105. A processor in the computer 215 obtains information about the item 127 (and other items) from a cloud storage device that is configured to store package inventory information and/or from a database that can be a part of the computer 215. The computer 215 identifies and sets up communications with an asset tracking and management system 236 of the vehicle 235. The communications can involve exchanging one or more messages including a message which informs the asset tracking and management system 236 that the vehicle 235 is assigned to travel to the first spot 225, pick up the item 127, and transport the item 127 to the second spot 230.

The vehicle 235 may travel to the first spot 225 and park near the trailer 107. A driver 237 of the vehicle 235 may manually transfer the item 127 from the trailer 107 to a trailer 238 of the vehicle 235. Alternatively, when the vehicle 235 is an autonomous vehicle, one or more automatons carried by the vehicle 235 and/or located at the first spot 225, may autonomously transfer the item 127 from the trailer 107 to the trailer 238 of the vehicle 235. The automatons can be of any of various types of robots such as, for example, an autonomous mobile robot (AMR), an automated guided vehicle (AGV), an articulated robot, an articulated arm, an industrial robot, a floor mounted robot, a humanoid, and a hybrid robot.

The asset tracking and management system 236 of the vehicle 235 and/or the asset tracking and management system 120 in the trailer 107 may then send a message to the computer 215 to inform the computer 215 that the item 127 has been transferred to the trailer 238. The asset tracking and management system 236 of the vehicle 235 may further communicate with the computer 215 when enroute to the second spot 230 and keep the computer 215 updated about the status of the item 127 (enroute, stopped, unloaded, delivered, etc.).

In a second example scenario, all the items in the trailer 107 are due for delivery to the second spot 230 that is not included in the first travel route of the vehicle 105. The asset tracking and management system 120 of the trailer 107 and/or the asset tracking and management system 115 in the vehicle 105 informs the computer 215 that the trailer 107 has been disconnected from the vehicle 105 and is ready for transportation by another vehicle. In this case, the computer 215 identifies, and sets up communications, with an asset tracking and management system 206 of the vehicle 205. In this example, the vehicle 205 does not have a trailer attached. However, in another example, a first trailer may be attached to the vehicle 205 and the vehicle 205 may be configured to accept hitching of a second trailer in tandem with the first trailer.

The communications between the computer 215 and the asset tracking and management system 206 of the vehicle 205 can involve exchanging one or more messages including a message which informs the asset tracking and management system 206 that the vehicle 205 is assigned to travel to the first spot 225, pick up the trailer 107, and transport the trailer 107 to the second spot 230.

The vehicle 205 may travel to the first spot 225 and park near the trailer 107. A driver 207 of the vehicle 205 may manually couple the trailer 107 to the vehicle 205. Alternatively, when the vehicle 205 is an autonomous vehicle, one or more automatons carried by the vehicle 205 and/or located at the first spot 225, may autonomously maneuver the vehicle 205 and hitch the trailer 107 to the vehicle 205. The automatons can be of any of various types of robots such as, for example, an autonomous mobile robot (AMR), an automated guided vehicle (AGV), an articulated robot, an articulated arm, an industrial robot, a floor mounted robot, a humanoid, and a hybrid robot.

The asset tracking and management system 206 of the vehicle 205 and/or the asset tracking and management system 120 in the trailer 107 may send a message to the computer 215 to inform the computer 215 that the trailer 107 is now attached to the vehicle 205. The asset tracking and management system 236 of the vehicle 205 may then communicate with the computer 215 when enroute to the second spot 230 and keep the computer 215 updated about the status of one or more of the items (enroute, stopped, unloaded, delivered, etc.) in the trailer 107.

In an example scenario, the vehicle 105 may not have a designated destination and/or travel route after detachment of the trailer 107. In this case, the computer 215 may assign a travel route for the vehicle 105 and may provide instructions for attaching another trailer to the vehicle 105, prior to heading out to an assigned destination on a new travel route. The other trailer (not shown) may be previously parked at the first spot 225 or may be transported to the first spot 225 by another vehicle.

Figure 3:
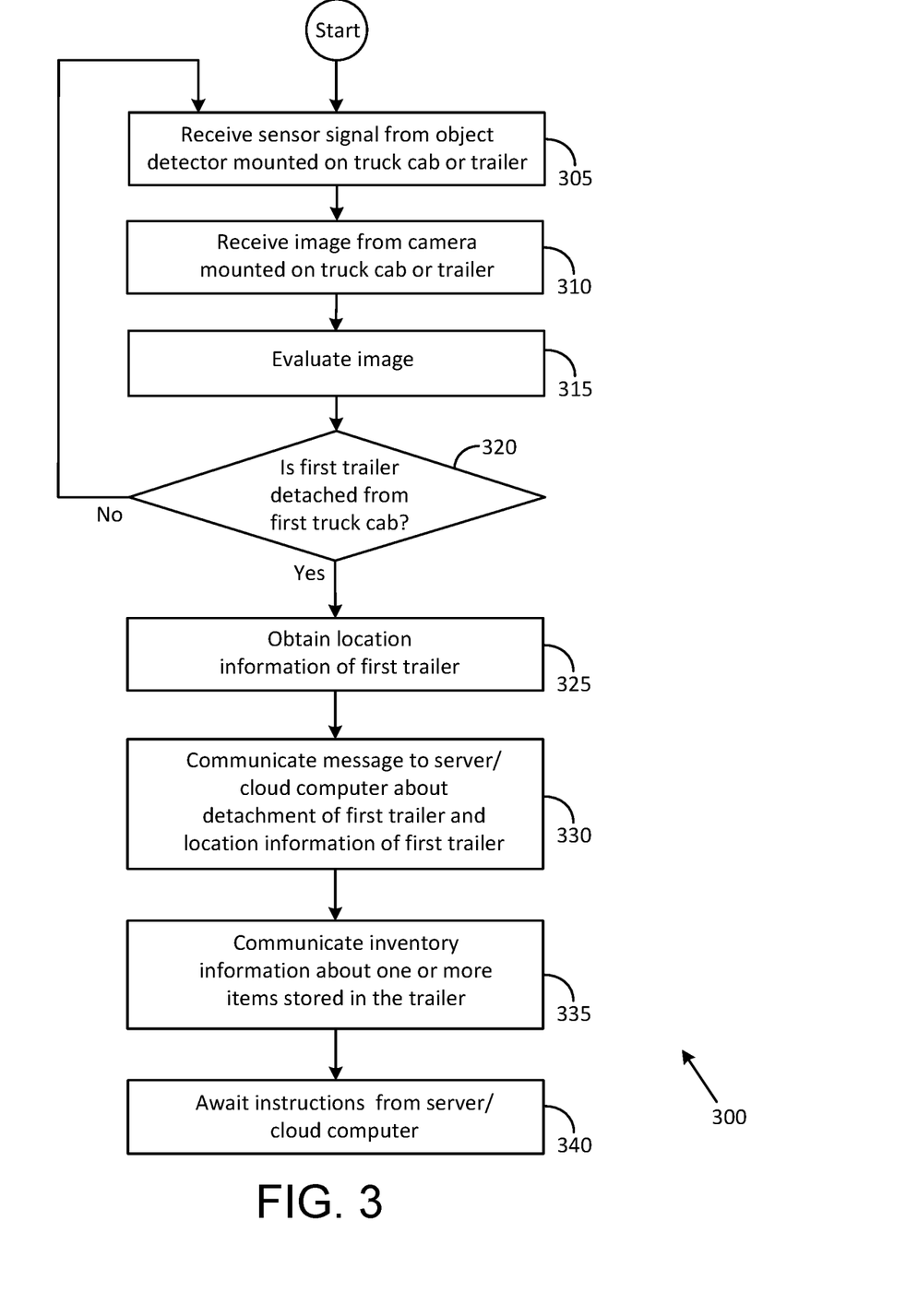
FIG. 3 shows a flowchart of an example method of operation of an asset tracking and management system in accordance with an embodiment of the disclosure.

FIG. 3 shows a flowchart 300 of an example method of operation of an asset tracking and management system in accordance with an embodiment of the disclosure. The flowchart 300 illustrates a sequence of operations that can be implemented in hardware, software, or a combination thereof. In the context of software, the operations represent computer-executable instructions stored on one or more non-transitory computer-readable media such as the memory 117 of the asset tracking and management system 115, that, when executed by one or more processors such as the processor 116 of the asset tracking and management system 115, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 305, an asset tracking and management system that may be located in a vehicle or a trailer attached to the vehicle, receives a sensor signal generated by an object sensor. The object sensor may generate the sensor signal based on detecting a detachment of the trailer from the vehicle.

At block 310, the asset tracking and management system may communicate with a camera located in a rear portion of the truck to obtain an image and/or a video clip of the trailer.

At block 315, the asset tracking and management system may evaluate the image and/or video clip to determine a location of the trailer with respect to the vehicle.

At block 320, a determination is made, based on evaluating the image and/or video clip, whether the trailer is detached from the vehicle. In an example scenario, the sensor signal can be a false alarm and the image may indicate that the trailer is still coupled to the vehicle. If so, the actions indicated at block 305 and subsequent blocks are repeated. If the image indicates that the trailer has been detached from the vehicle, at block 325, the asset tracking and management system obtains location information of the trailer. In an example scenario, the location information can be GPS coordinates obtained from a GPS system in the vehicle or trailer. In another example scenario, the location information may be obtained based on evaluating one or more images captured by one or more cameras provided on the vehicle and/or trailer. The images may include landmarks in the vicinity of the trailer such as, for example, a sign of a commercial establishment (gas station, motel, convenience store, etc.), a road sign (street sign, road sign etc.), and/or a building (town hall, court house, tourist attraction, etc.).

At block 330, the asset tracking and management system may wirelessly communicate with a server computer and/or cloud computer, to convey information about the vehicle and/or trailer, such as, for example, the detachment of the trailer from the vehicle and the location information of the trailer after detachment.

At block 335, the asset tracking and management system may provide to the server computer and/or cloud computer, additional information related to one or more items contained in the trailer, such as, for example, inventory information, tracking number, identification label, size, shape, addresses, and dates (delivery date, shipping date, etc.).

At block 340, the asset tracking and management system may wait for instructions from the server computer and/or cloud computer.

Figure 4:
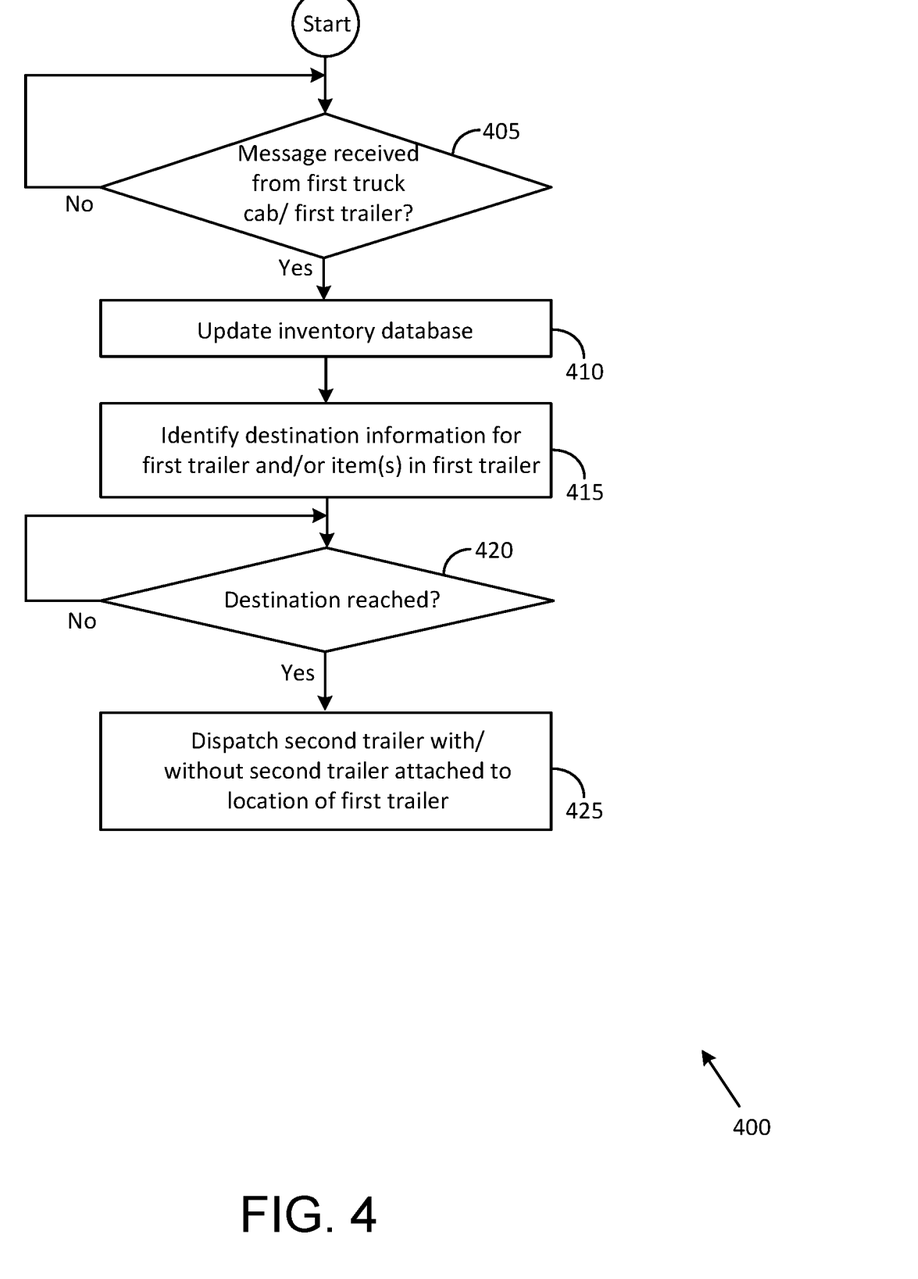
FIG. 4 shows a flowchart of an example method of operation of a server computer or cloud computer in accordance with an embodiment of the disclosure.

FIG. 4 shows a flowchart 400 of an example method of operation of a server computer or cloud computer in accordance with an embodiment of the disclosure. The flowchart 400 illustrates a sequence of operations that can be implemented in hardware, software, or a combination thereof. In the context of software, the operations represent computer-executable instructions stored on one or more non-transitory computer-readable media such as a memory in a server computer or cloud computer, that, when executed by one or more processors such as a processor in the server computer or cloud computer, perform the recited operations. The description below refers to a server computer but it must be understood that the description is equally applicable to a cloud computer.

At block 405, the server computer determines whether a message has been received from an asset tracking and management system of a first vehicle or a first trailer attached to the first vehicle. If no message has been received, the server computer continues to wait for a message.

If a message has been received, at block 410, the server computer may update an inventory database based on information contained in the message. For example, a message may provide information related to one or more items contained in the first trailer, such as, for example, inventory information, tracking number, identification label, size, shape, addresses, and dates (delivery date, shipping date, etc.).

At block 415, destination information of the first trailer and/or one or more items contained in the first trailer is identified. In an example scenario, the first trailer (along with all its contents) may have to be transported to a destination that is not included in a designated travel route of the first vehicle. In this example scenario, the trailer has to be disconnected from the vehicle and re-attached to a replacement vehicle that can travel to the intended destination of the trailer.

In another example scenario, one or more items contained in the first trailer are to be delivered at a destination that is not included in a designated travel route of the first vehicle. In this scenario, the one or more items have to be unloaded from the first trailer and loaded into a second trailer that may be attached to a replacement vehicle.

At block 420 a determination is made whether the first vehicle has reached a spot where the trailer or an item located in the trailer can be transferred to another vehicle. This action may be carried out, for example, via communications carried out between the server computer and the asset tracking and management system of the first vehicle or the first trailer. The communications are persisted if the destination has not yet been reached.

If the spot has been reached, at block 425, in one case, a second vehicle may be dispatched to the location of the first trailer for transporting the trailer (and its contents) to the destination of the trailer. In another case, a second vehicle with a second trailer attached may be dispatched to the location of the first trailer for transporting the one or more items to one or more destinations for the one or more items. The one or more items may be transferred from the first trailer to the second trailer either manually by a driver of the second vehicle, for example, or by use of automatons. In another example scenario, the second vehicle may be dispatched to the location where the first trailer is expected to be located, prior to the first vehicle reaching the spot where the transfer can take place.

Figure 5:
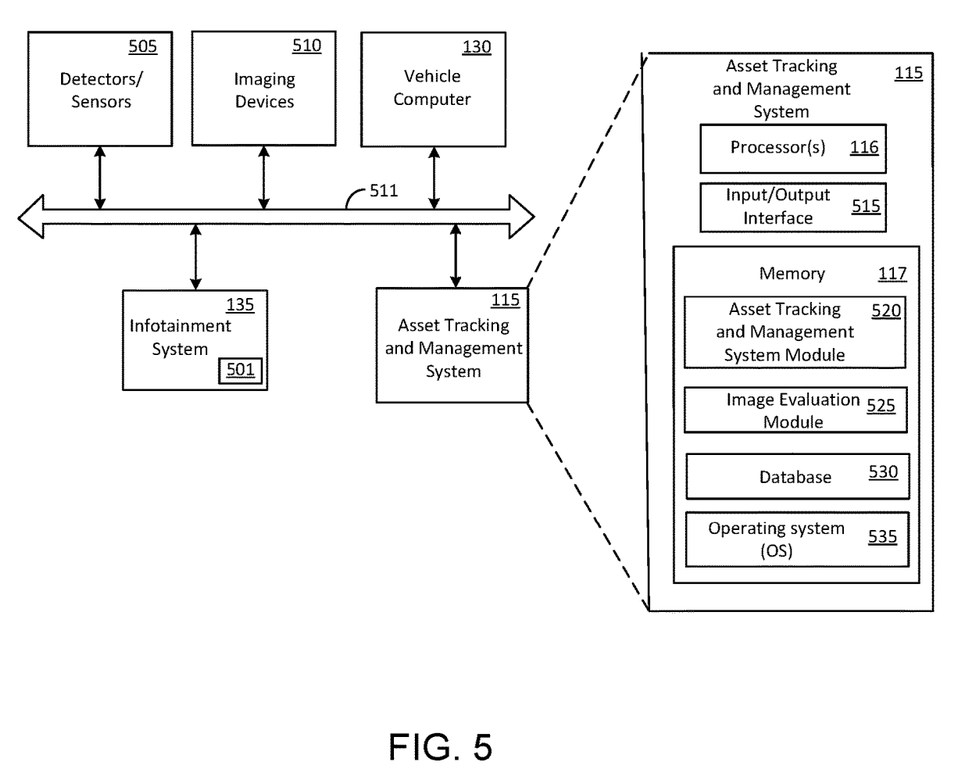
FIG. 5 shows some example components that can be included in a vehicle in accordance with an embodiment of the disclosure.

FIG. 5 shows some example components that can be included in the vehicle 105 in accordance with an embodiment of the disclosure. The example components can include detectors/sensors 505, imaging devices 510, the vehicle computer 130, the infotainment system 135, and the asset tracking and management system 115. The various components are communicatively coupled to each other via one or more buses such as an example a bus 511. The bus 511 may be implemented using various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies such as Bluetooth®, Bluetooth®, Ultra-Wideband, Wi-Fi, Zigbee®, or near-field-communications (NFC).

The detectors/sensors 505 can include various types of detectors/sensors such as, for example, a motion sensor, a radar detector, a sonar detector, a light detection and ranging (LIDAR) detector, and/or an infrared detector. In an example implementation, the object sensor 109 can be any of such detectors/sensors.

The imaging devices can include any of various types of cameras such as, for example, a digital camera, a video camera, or an infrared camera. In the illustrated implementation shown in FIG. 1, the camera 108 is an example imaging device configured to provide information to the asset tracking and management system 115 in the form of images. In other implementations, additional cameras and/or other types of devices may be used to provide information to the asset tracking and management system 115. The images provided by the cameras may be evaluated by the asset tracking and management system 115 for various purposes. In an example scenario, the asset tracking and management system 115 may evaluate images provided by the camera 108 to detect a status of the trailer 107 with respect to the vehicle 105 such as, for example, whether the trailer 107 is attached to vehicle 105, detached from the vehicle 105, being detached from the vehicle 105, or being attached to the vehicle 105.

The signals conveyed by the various detectors of the detectors/sensors 505 to the asset tracking and management system 115 can vary in accordance with the type of detector. For example, the camera 108 can provide an image of the trailer 107 in one of various formats (jpeg, mpeg, etc.).

The infotainment system 135 can include a display system having a GUI 501 that may be used performing various operations. The GUI may be used, for example, by the driver 110 of the vehicle 105 to interact with the asset tracking and management system 115. In an example implementation, the asset tracking and management system 115 can display step-by-step text instructions, oral instructions, and/or graphical images, that assist the driver 110 perform various actions in accordance with the disclosure. Some example actions can include detaching the trailer 107 from the vehicle 105, attaching the trailer 107 to another vehicle 205, transferring one or more items from the trailer 107 to another trailer 238, route information for a travel route, and addresses of various locations along a travel route (spot 220, spot 225, spot 230, etc.).

The asset tracking and management system 115 can be implemented in various ways. In one example implementation, the asset tracking and management system 115 can be an independent device (enclosed in an enclosure, for example). In another example implementation, some or all components of the asset tracking and management system 115 can be housed, merged, or can share functionality, with the vehicle computer 130. For example, an integrated unit that combines the functionality of the asset tracking and management system 115 with that of the vehicle computer 130 can be operated by a single processor and a single memory device. In the illustrated example configuration, the asset tracking and management system 115 includes the processor 116, an input/output interface 515, and a memory 117.

The input/output interface 515 is configured to support information transfer and communications between the asset tracking and management system 115 and other components coupled to the bus 511, such as, for example, to receive images from the imaging devices 510 and signals from the detectors/sensors 505.

The memory 117, which is one example of a non-transitory computer-readable medium, may be used to store an operating system (OS) 535, an image evaluation module 525, a database 530, and various code modules such as, for example, an asset tracking and management system module 520. The code modules are provided in the form of computer-executable instructions that can be executed by the processor 116 for performing various operations in accordance with the disclosure.

The asset tracking and management system module 520 may be executed by the processor 116 for performing various operations in accordance with the disclosure. Some example operations are described above with reference to the flowchart 300. Execution of some of these operations can involve the asset tracking and management system module 520 utilizing the image evaluation module 525 (for evaluating images captured by a camera such as, for example, the camera 108).

The database 530 can be used to store various types of data such as, for example, information related to the vehicle 105, the trailer 107, the contents of the trailer 107, travel routes, addresses, schedules, tracking, and inventory.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the functions described herein can be performed in one or more of hardware, software, firmware, digital components, or analog components. For example, one or more application specific integrated circuits (ASICs) can be programmed to carry out one or more of the systems and procedures described herein.

Certain terms are used throughout the description, and claims refer to particular system components. As one skilled in the art will appreciate, components may be referred to by different names. This document does not intend to distinguish between components that differ in name, but not function.

It should be noted that the detector embodiments discussed above may comprise computer hardware, software, firmware, or any combination thereof to perform at least a portion of their functions. For example, a detector may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, by a first processor, detachment of a first trailer from a first vehicle at a first geographical location;
   communicating, by the first processor to a second processor, a message that informs the second processor of the detachment of the first trailer from the first vehicle and includes location information for identifying the first geographical location; and
determining, by the first processor and/or the second processor, inventory information comprising at least one of a tracking number or a description of at least a first item contained in the first trailer.

2. The method of claim 1, wherein the first processor is a part of an asset tracking and management system provided in at least one of the first trailer or the first vehicle, and wherein the second processor is a part of one of a server computer or a cloud computer.

3. The method of claim 2, wherein detecting the detachment of the first trailer from the first vehicle comprises evaluating a video clip that includes at least one image of the first trailer.

4. The method of claim 2, further comprising:
determining, by the first processor and/or the second processor, at least one of an identification label or an odometer reading of at least one of the first trailer or the first vehicle.

5. The method of claim 2, further comprising:
determining, by the first processor and/or the second processor, a request to dispatch a second vehicle to the first geographical location to transport one of the first trailer or the at least the first item contained in the first trailer to a second geographical location.

6. The method of claim 2, further comprising:
providing, by the first processor, at least one of a set of step-by-step text instructions or a set of step-by-step oral instructions to assist a driver of the first vehicle transfer the at least the first item from the first trailer to a second trailer that is attached to the second vehicle.

7. The method of claim 2, further comprising:
initiating, by the first processor, communications with a third processor of an automaton to enable the third processor to operate the automaton for transferring the at least the first item from the first trailer to a second trailer that is attached to the second vehicle.

8. The method of claim 2, wherein the location information comprises global positioning system (GPS) coordinates of the first geographical location.

9. A method comprising:
receiving, by a first processor, from a second processor, a first message that informs the first processor of a detachment of a first trailer from a first vehicle at a first geographical location and includes location information of the first geographical location; and
assigning, by the first processor, a second vehicle to travel to the first geographical location by using the location information and transport one of the first trailer or at least a first item contained in the first trailer to a second geographical location.

10. The method of claim 9, wherein the first processor is a part of one of a server computer or a cloud computer and wherein the second processor is a part of an asset tracking and management system provided in at least one of the first trailer or the first vehicle.

11. The method of claim 10, further comprising:
receiving, by the first processor, from the second processor, at least one of an identification label or an odometer reading of at least one of the first trailer or the first vehicle.

12. The method of claim 10, wherein the location information comprises global positioning system (GPS) coordinates of the first geographical location.

13. The method of claim 10, wherein the first message further includes at least one of a tracking number or a description of the first item.

14. The method of claim 13, further comprising:
receiving, by the first processor, from the second processor, a second message that informs the first processor of a transfer of the at least the first item from the first trailer to a second trailer that is attached to the second vehicle; and
receiving, by the first processor, from a third processor located in one of the second vehicle or the second trailer attached to the second vehicle, a confirmation of the transfer of the at least the first item from the first trailer to the second trailer.

15. The method of claim 14, further comprising:
receiving, by the first processor, from the third processor, information associated with tracking a movement of the second vehicle with the at least the first item located in the second trailer.

16. A system comprising:
at least one of a server computer or a cloud computer;
a first vehicle coupled to a first trailer;
a camera mounted upon one of the first vehicle or the first trailer;
a first asset tracking and management system provided in at least one of the first vehicle or the first trailer attached to the first vehicle, the first asset tracking and management system comprising:
a first memory that stores computer-executable instructions; and
a first processor configured to access the first memory and execute the computer-executable instructions to at least:
evaluate an image of the first trailer that is captured by the camera;
detecting, based on evaluating the image, a detachment of the first trailer from the first vehicle at a first geographical location;
obtaining location information of the first geographical location;
communicating to the one of the server computer or the cloud computer, a message that informs the one of the server computer or the cloud computer of the detachment of the first trailer from the first vehicle and includes location information for identifying the first geographical location; and
communicating to the one of the server computer or the cloud computer, a request to dispatch a second vehicle to the first geographical location to transport one of the first trailer or at least a first item contained in the first trailer, to a second geographical location.

17. The system of claim 16, further comprising:
a second asset tracking and management system provided in at least one of the second vehicle or a second trailer attached to the second vehicle, the second asset tracking and management system comprising:
a second memory that stores computer-executable instructions; and
a second processor configured to access the second memory and execute the computer-executable instructions to at least:
receive, from the one of the server computer or the cloud computer, an instruction to travel to the first geographical location and transport the one of the first trailer or the at least the first item contained in the first trailer, to the second geographical location.

18. The system of claim 16, wherein the at least the one of the first vehicle or the first trailer includes a communication system configured to wirelessly transmit the message to the one of the server computer or the cloud computer.

19. The system of claim 17, wherein the first vehicle further includes a navigation system configured to provide to the first asset tracking and management system location information of the first geographical location in the form of global positioning system (GPS) coordinates.

20. The system of claim 16, wherein a portion of the first memory is configured as a database for storing at least one of inventory information of the at least the first item or tracking information of the at least the first item.

* * * * *